Patented Aug. 10, 1954

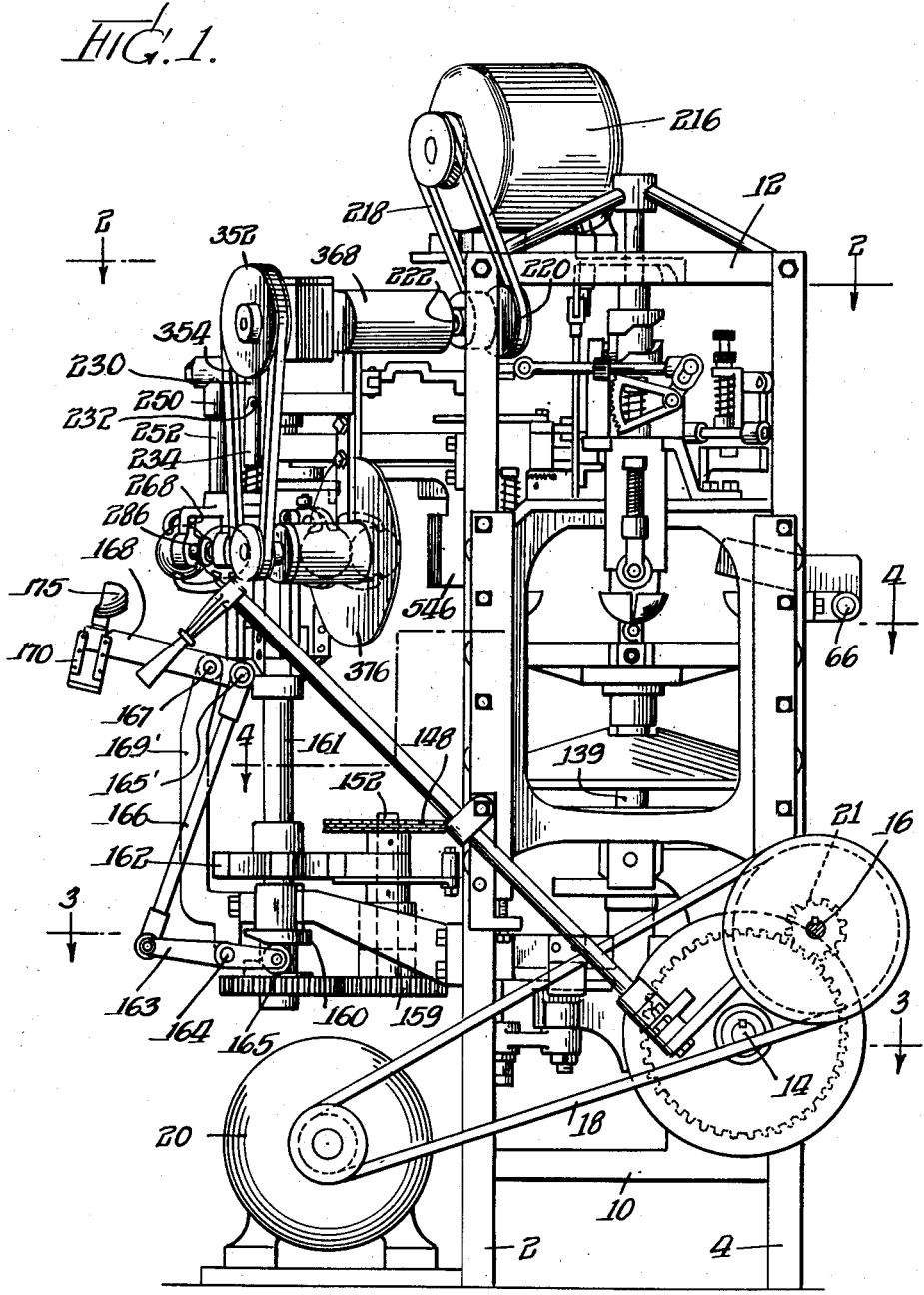

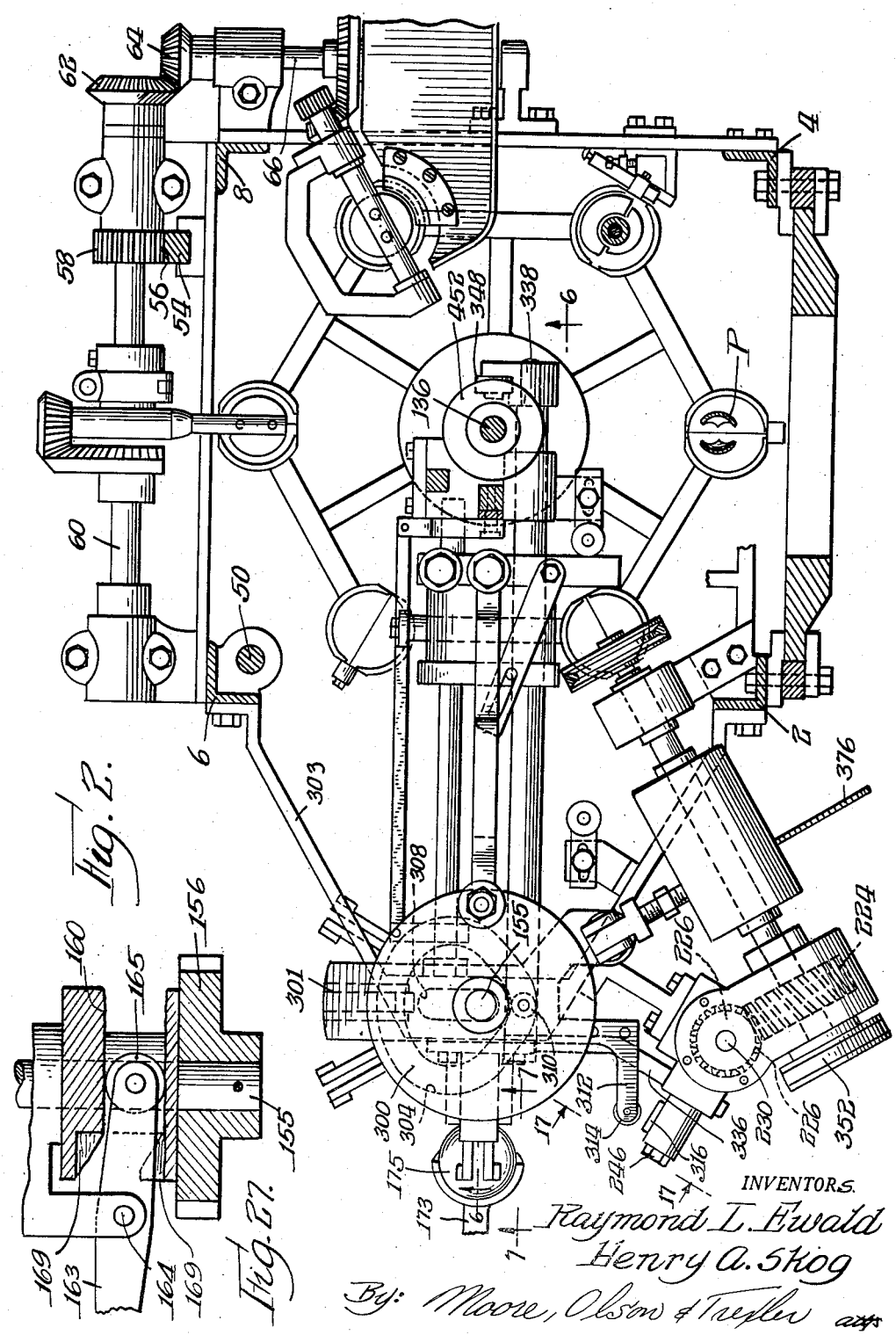

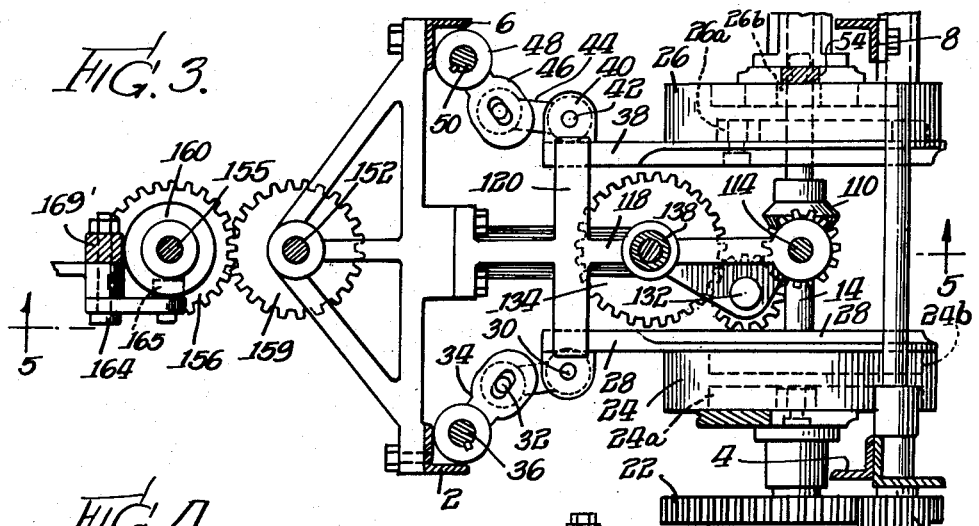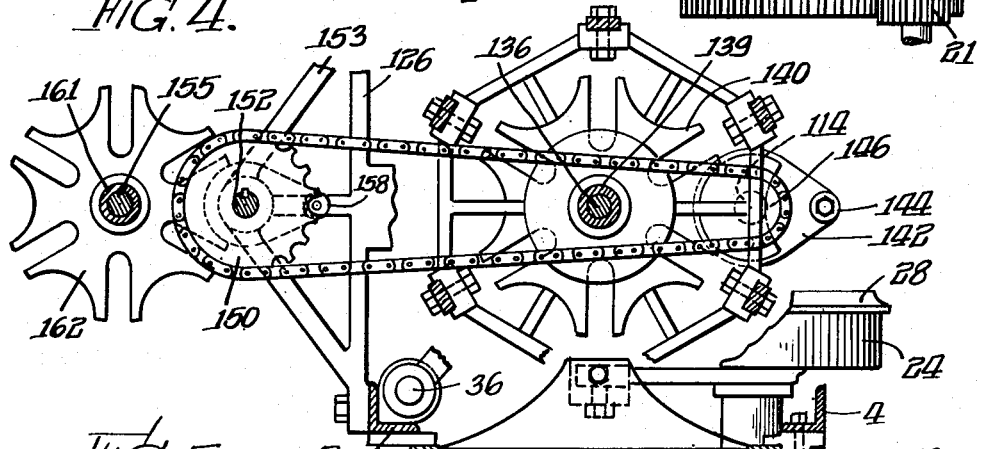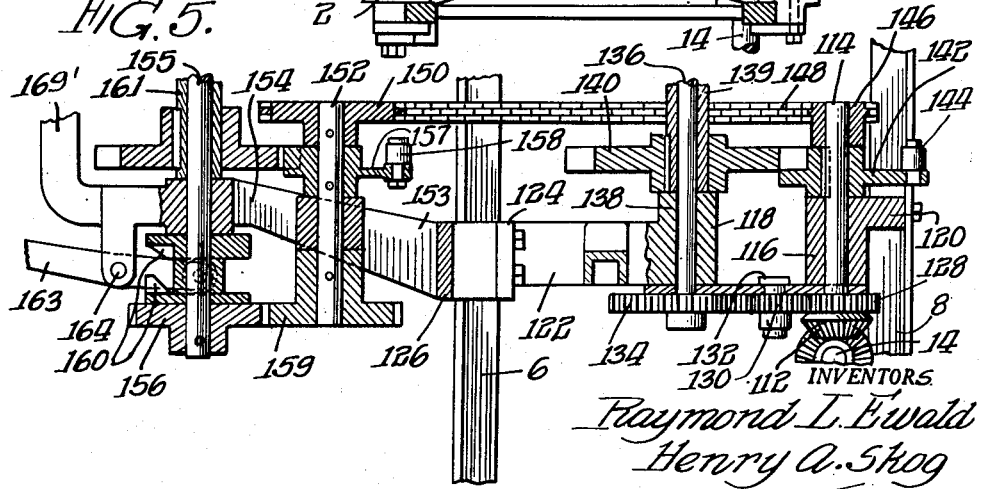

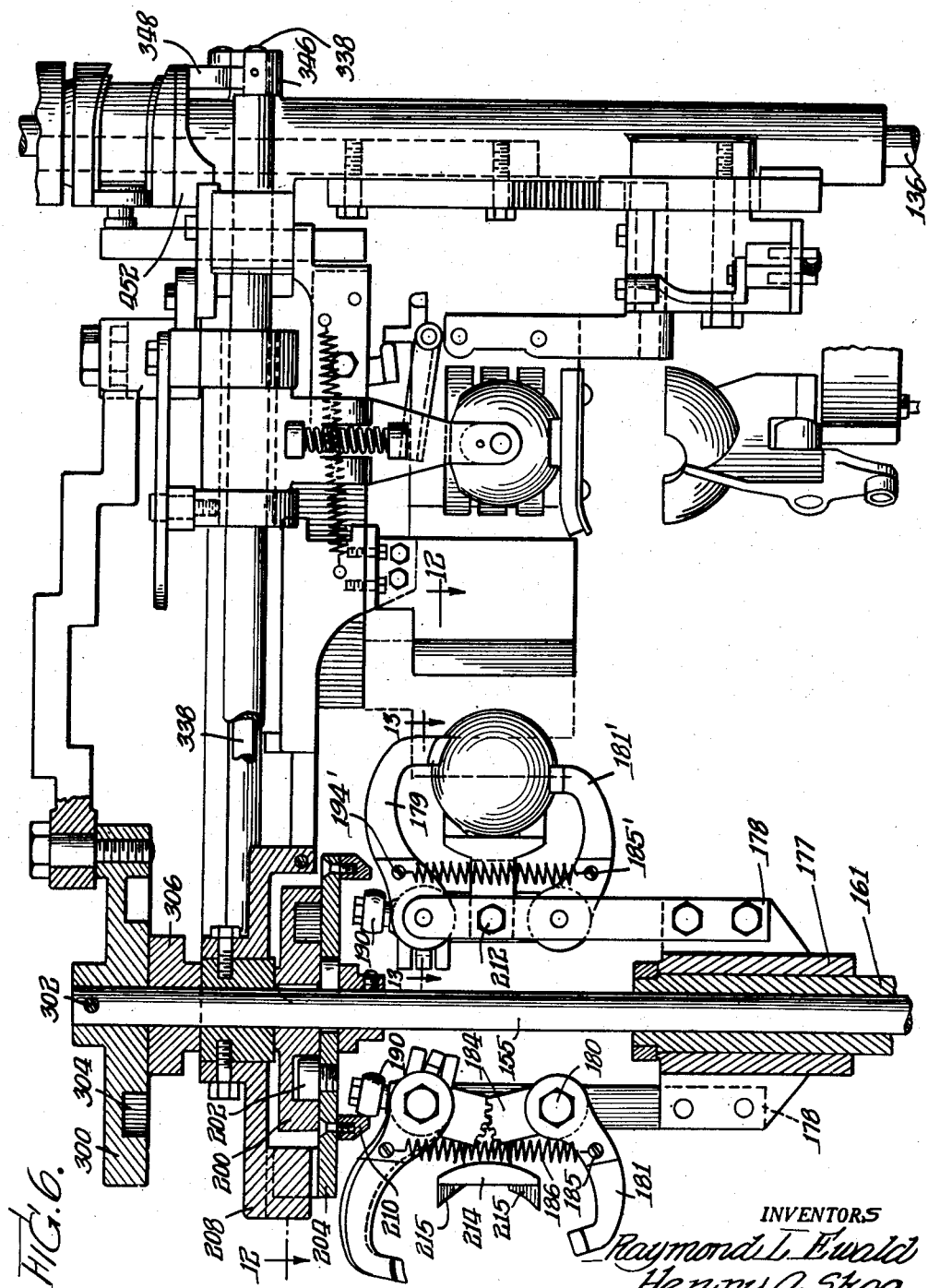

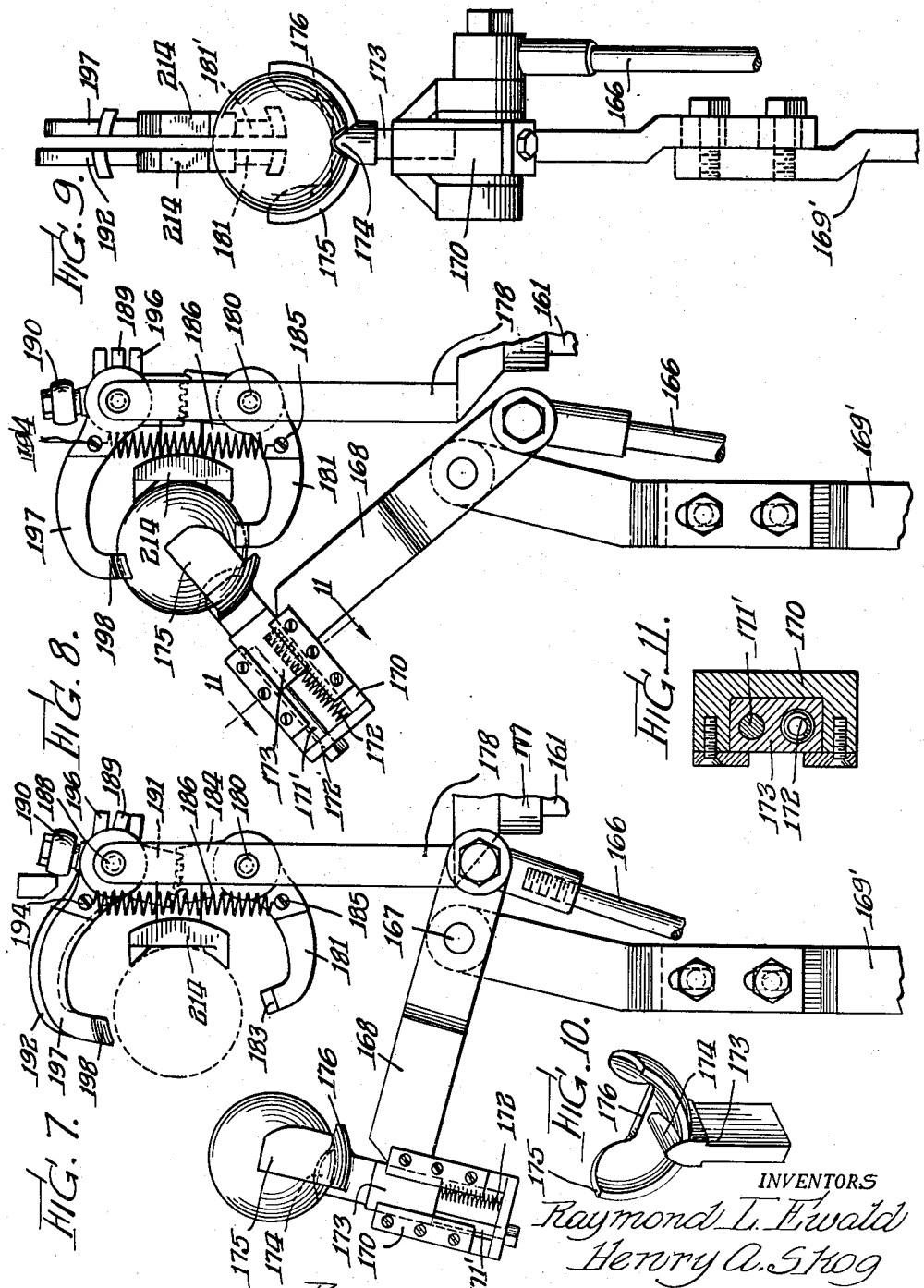

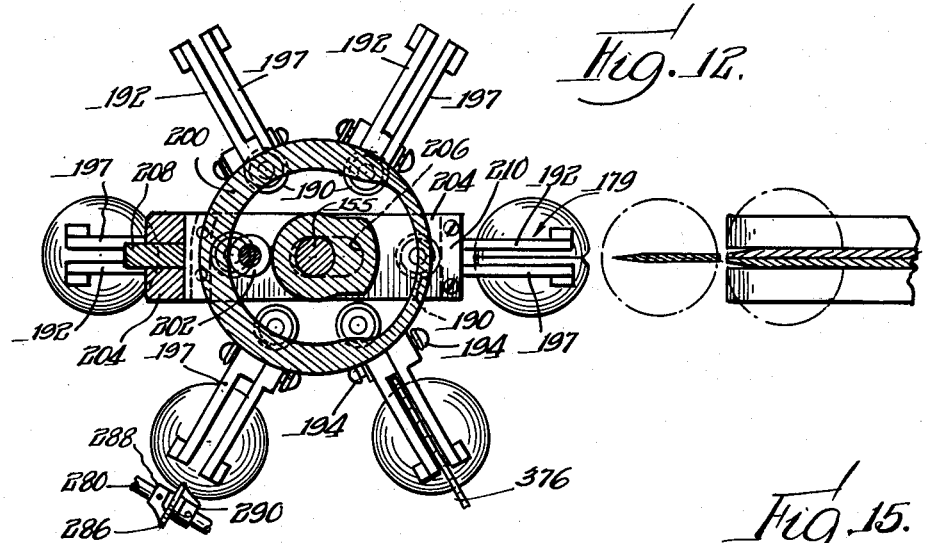
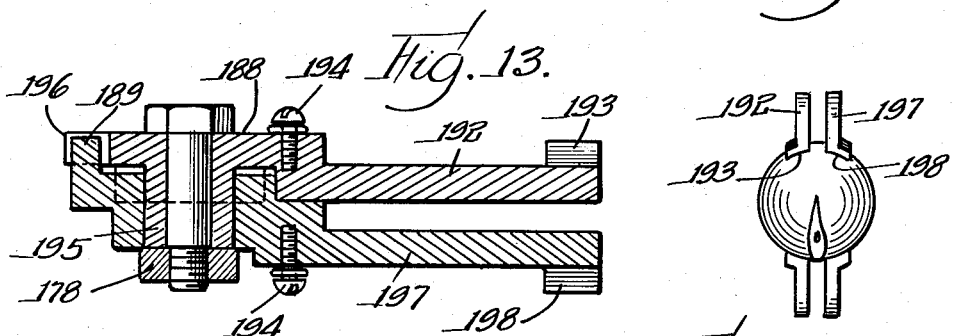
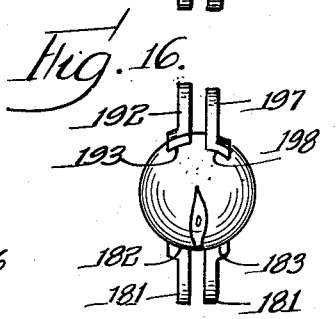
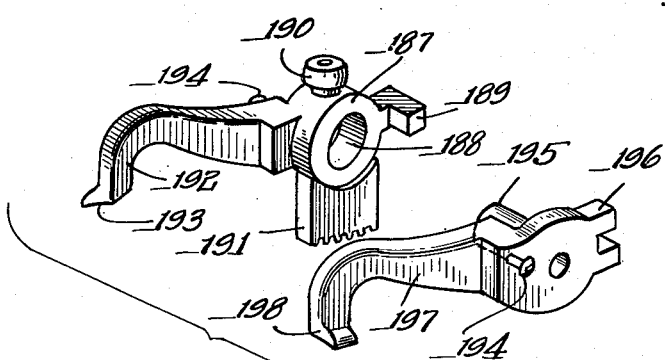

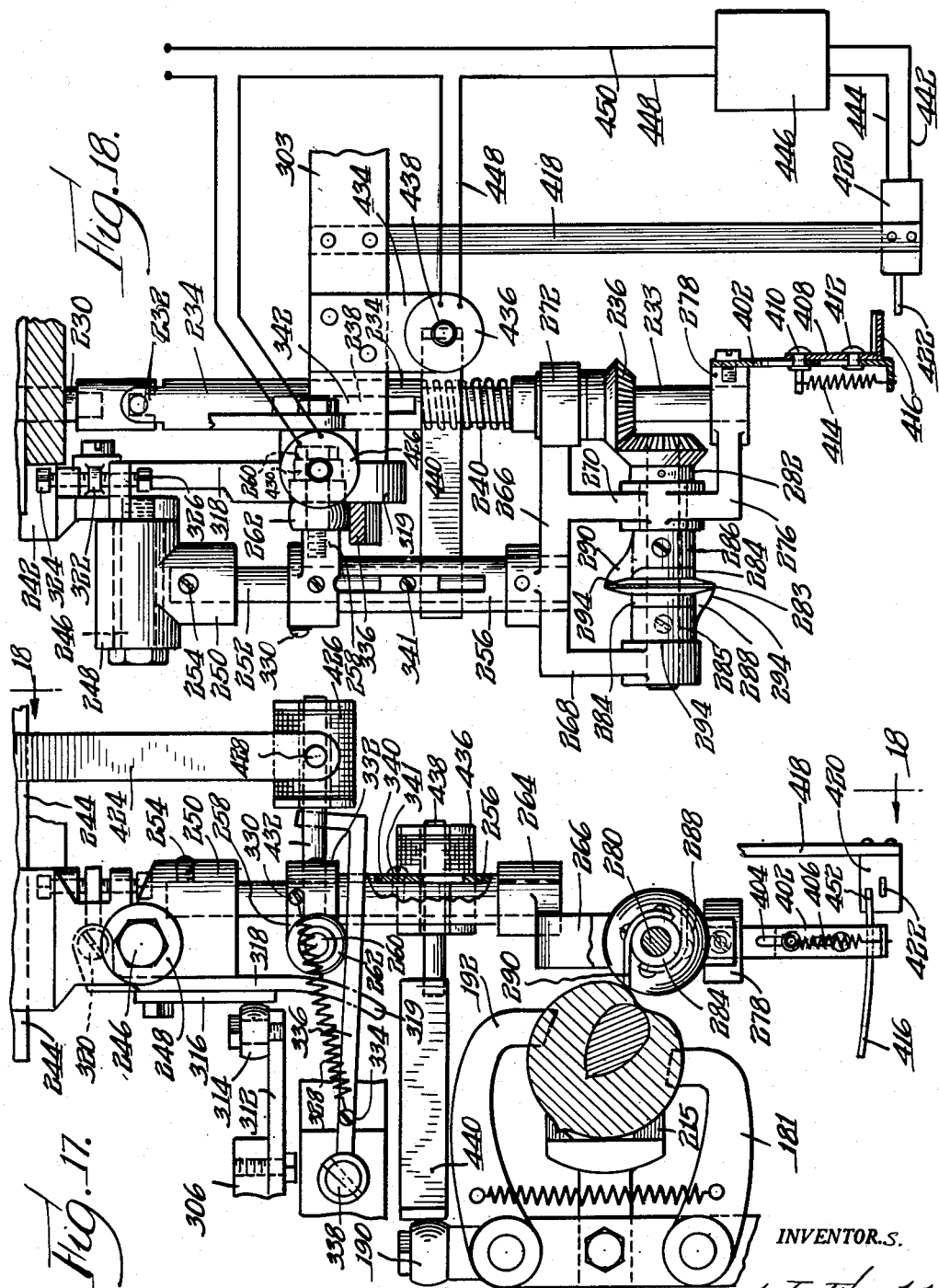

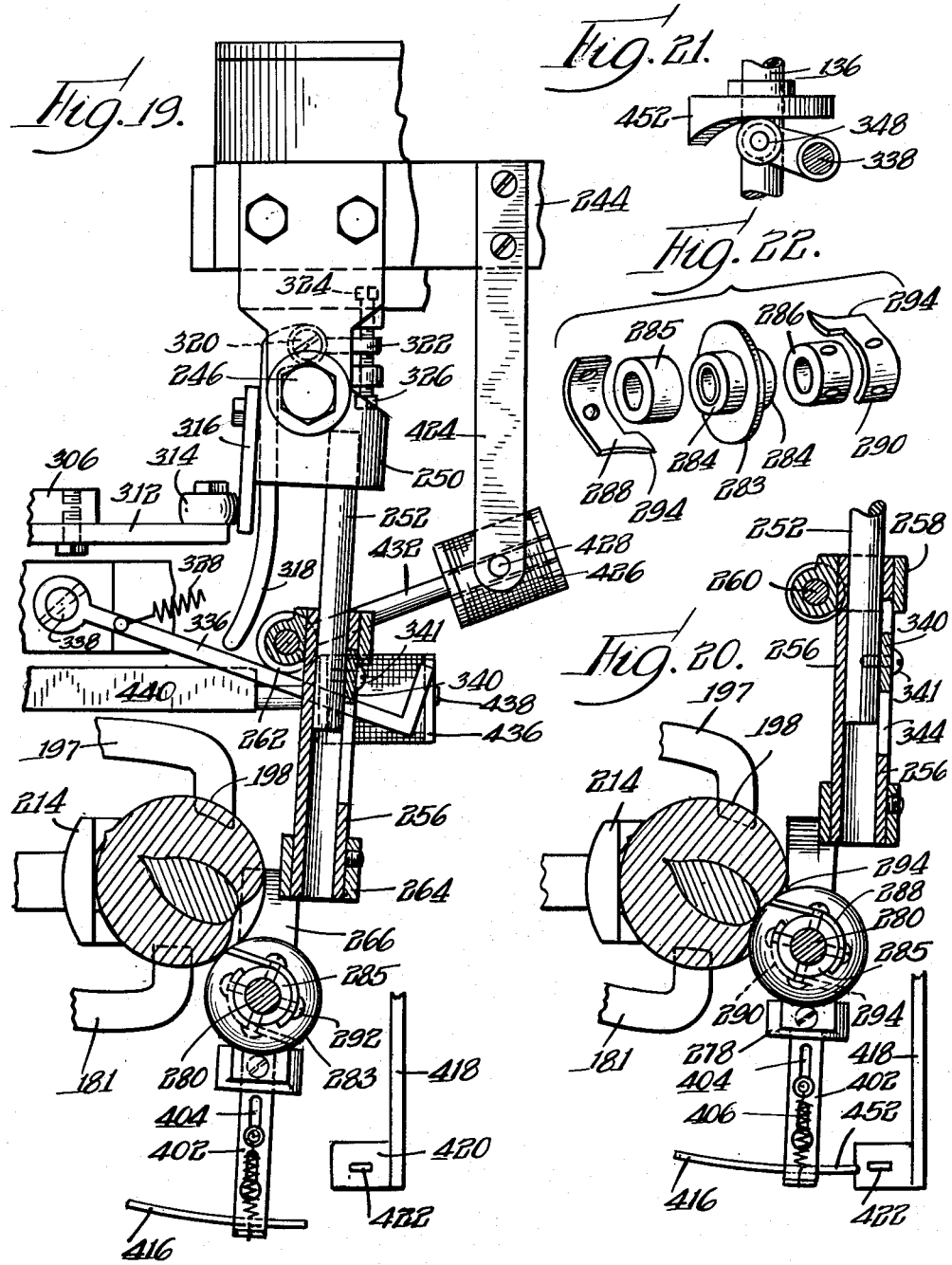

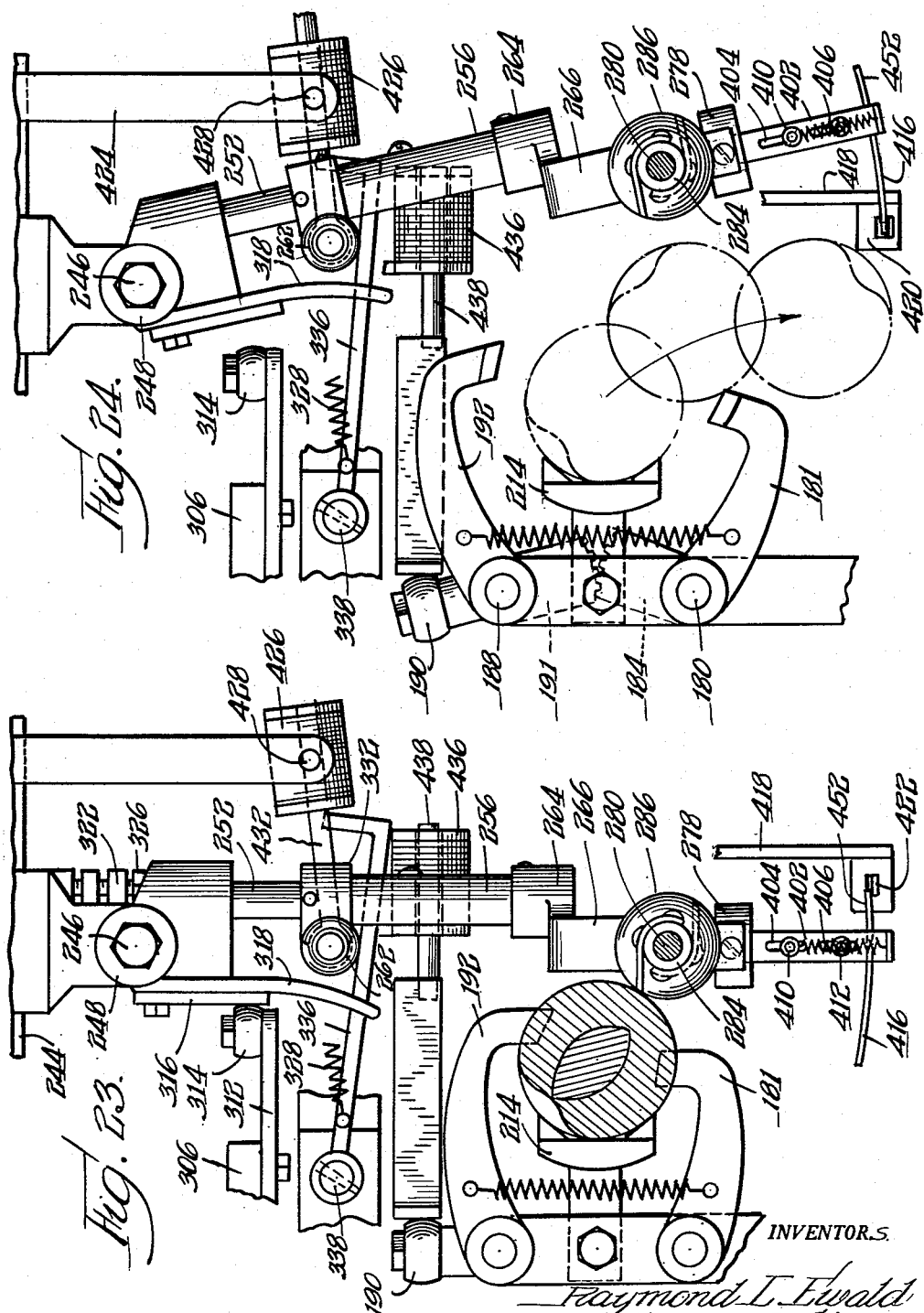

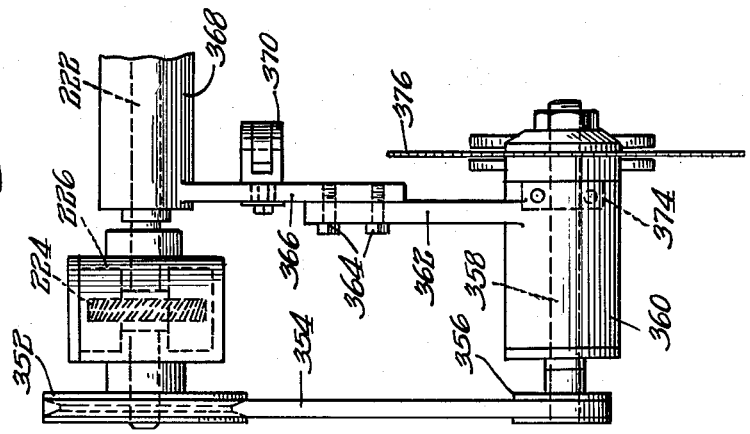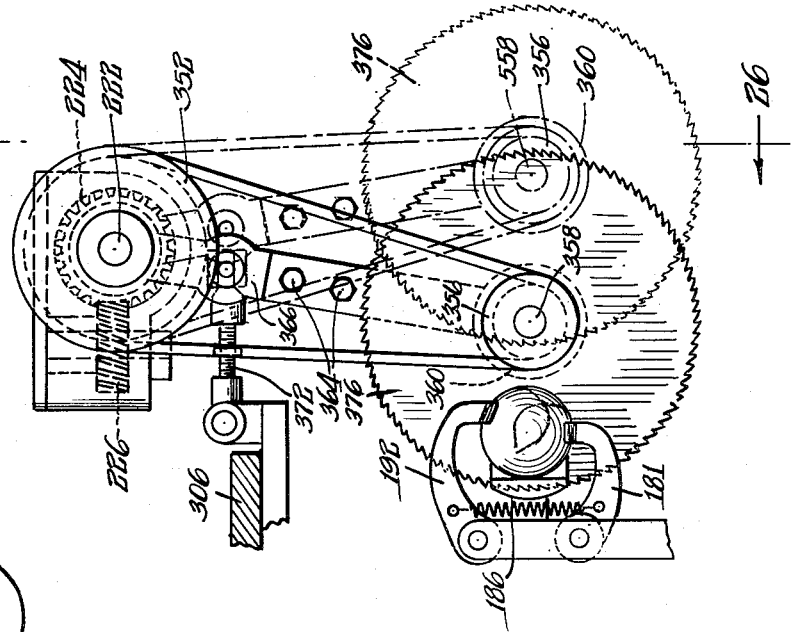

2,685,899

UNITED STATES PATENT OFFICE 2,685,899

FRUIT ORIENTING, INSPECTING, AND CUTTING MACHINE

Raymond L. Ewald and Henry A. Skog, Olympia, Wash., assignors to Special Equipment Company, Portland, Oreg., a corporation of Oregon Application April 9, 1949, Serial No. 86,492

3 Claims. (Cl. 146—7)

This invention relates to an apparatus for processing fruit and particularly whole peaches.

The disclosure and claims of the present application relate to a machine for processing fruit wherein means is provided for effecting the suture plane orientation of the peach, in combination with sensing or inspecting means for determining whether or not the peach has been oriented properly as to its suture plane, and including mechanism operable to prevent the peach from being further processed, including the peach bisecting and/or the peach pitting operation, in the event that the peach has not been so properly oriented as to its suture plane.

In the present invention various mechanisms are combined to effect the foregoing functions, and in particular mechanism is associated with sensing or inspecting means for determining whether or not the suture plane of the peach has been oriented as to a particular plane, in combination with means for discharging the improperly oriented whole peach from the machine before the peach can be fed to the peach bisecting mechanism. In more particular, the invention includes means for conveying or transporting a peach from the orienting means to the bisecting means and in combination with means for determining whether or not the peach has been properly oriented as to its suture plane, and if not, there is provided means for discharging the peach from the conveying or transfer means before the peach can be fed to the bisecting means so that the improperly oriented whole peach is not improperly bisected and whereby the peach can then be recovered and again pass through the machine for subsequent treatment.

Still another aspect of the invention is that it includes inspecting or sensing means associated with means for supporting a whole peach, which sensing means is adapted to roll along the peripheral surface of the peach and through the long axis of the stem indent of the peach, which of course corresponds to the suture plane of the peach, together with means actuated by a predetermined relative bodily movement between the whole peach and the sensing means that rolls along the surface of the peach governing the operation of actuating mechanism for precluding or preventing the peach being bisected in the event that the peach be not properly oriented as to its suture plane.

In yet another aspect of the invention there is provided means including an orienting member generally shaped to enter or fit into the longitudinal axis of the stem indent of the peach to a maximum extent, together with means for producing a relative movement between a peach and said orienting member whereby the peach is correctly oriented as to its suture plane and whereby the suture plane of the peach is shifted into a proper predetermined plane, together with means for conveying the peach so properly oriented to a suture plane including an inspection member operable to determine whether or not the stem indent or suture plane of said peach is in a predetermined plane, in combination with means operable if the suture plane of the peach be not in said predetermined plane to prevent the bisecting or any cutting operation performed on the peach whereby the peach thus improperly oriented may be returned to the machine for subsequent processing.

A further object of the invention is to provide in combination with means for supporting a whole peach, a member shaped to enter to maximum extent the longitudinal stem axis of the whole peach, together with means for causing relative shifting movement between the whole peach and said member while the peach is so supported for causing the entry to maximum extent of said member into the long axis of the peach whereby properly to orient the suture plane of the peach, in association with means for feeding a peach thus oriented to peach bisecting means, and in combination further with sensing means operable upon the peach prior to the peach reaching the peach bisecting station for determining whether or not the peach has been properly oriented as to its suture plane, and including mechanism for precluding the feeding or for preventing the bisecting of the peach if the peach be not so properly oriented.

More specifically, one of the features of the invention comprises in association with the invention of the foregoing paragraph, a specific means for discharging the peach from the peach feeding means before the peach is fed to the peach bisecting or processing means in the event that the peach is not so properly oriented as to its suture plane.

These and other objects and aspects of invention will be apparent from a perusal of the following specification when taken in connection with the accompanying drawings wherein:

Figure 1 is a view of the machine as seen from the in-feed pitting stations;

Figure 2 is an enlarged plan view taken on the line 2—2 of Figure 1;

Figure 3 is an enlarged section taken on the line 3—3 of Figure 1;

Figure 4 is an enlarged section taken on the line 4—4 of Figure 1;

Figure 5 is a section taken on the line 5—5 of Figure 3;

Figure 6 is an enlarged section taken on the line 6—6 of Figure 2;

Figure 7 is an enlarged section taken on the line 7—7 of Figure 2;

Figure 8 is a view similar to Figure 7, but showing the feeding mechanism in a subsequent position;

Figure 9 is a front view of the mechanism shown in Figure 8;

Figure 10 is a perspective view of the whole fruit cup;

Figure 11 is an enlarged detail sectional view taken on the line 11—11 of Figure 8;

Figure 12 is a sectional view taken through the line 12—12 of Figure 6;

Figure 13 is an enlarged section taken on the line 13—13 of Figure 6;

Figure 14 shows enlarged perspective views of the peach holding members;

Figures 15 and 16 are front views of the same fruit holding jaws;

Figure 17 is an enlarged section taken on the line 17—17 of Figure 2, and including in one aspect of the invention means for orienting the suture plane of the whole fruit, in combination with means for preventing the whole fruit from being bisected, or in connection with another aspect of the invention, showing fruit sensing or inspecting means adapted to contact the whole peach to determine whether or not the suture plane of the peach has been correspondingly oriented, and in association therewith means for preventing the peach from being bisected or processed in the event that the peach is not properly oriented as to its suture plane;

Figure 18 is a section taken at right angles to Figure 17;

Figure 19 is a view taken somewhat after the view of Figure 17 but showing a different position of the actuating mechanism;

Figure 20 is still another view showing a different position of the parts;

Figure 21 is a view of a cam mechanism;

Figure 22 is a view of the peeling cutter;

Figure 23 is a view of the action of the mechanism shown in Figure 17 when the wheel does not enter the stem indent of the suture plane;

Figure 24 is a similar view showing the peach discharged from the feeding or transfer means;

Figures 25 and 26 are enlarged views of the peach bisecting mechanism; and

Figure 27 is an enlarged view of one of the cams for vibrating the fruit supporting and feeding member 176.

Referring now to the drawings in detail:

General machine structure

The invention of the present construction preferably takes the form of an upright, substantially square main frame comprising four corner posts or angle irons 2, 4, 6, and 8 (see Figures 1, 3, and 4), suitably braced at top and bottom by crossbraces 10 and 12. In addition, other hereinafter decsribed cross bars serve as rigid supports for these upright members. In a general way, extending laterally from this rectangular frame projects a supplementary frame adapted to be bolted or otherwise attached thereto, as shown in Figures 1 to 4, inclusive, which supplementary frame is utilized to support the mechanism which initially receives and orients the fruit; the mechanism which severs the peeling at the stem cavity of the fruit, which severs the fruit in halves and which transports the severed halves to the pitting, peeling, fruit-discharging and peel-scavenging mechanism.

The main upright frame hereinbefore described is provided on a relatively low level thereof with horizontally disposed shafts 14 and 16, the latter being power driven through a clutch mechanism (see Figure 1) by means of a belt 18, adapted, in turn, to be driven from any suitable motor 20. The clutch mechanism is of any desirable construction capable of connecting and disconnecting the power source to the main operating shaft of the machine.

The shaft 16 carries a gear 21, driving another gear 22 on the horizontal shaft 14. This shaft 14 carries two main cams 24 and 26 fixed on opposite ends thereof. Each of these cams are double-faced so as to provide cam operating means on each side thereof. Cam face 24a comprises a cam track in which operates a hereinafter described roller on a vertically reciprocable slide for raising and lowering the main tool carrying slide hereinafter described. An opposed cam face forms a roller race, in which a roller on a horizontally reciprocable slide 28 shifts in a horizontal motion transversely to the shaft 14. This slide carries on its outer end a bearing pivot 30 linked to a bearing pivot 32 on an arm 34 fixed on a vertical shaft 36. This shaft has fixed bearings in the housing frame 2 of the main upright frame of the machine. Vertical shaft 36 is oscillated by the slide 28 for operating the peeling mechanism, the details of which are not herein shown.

The cam 26 of the shaft 14 has a cam face 26a forming a cam race, which operates a roller, connected to and operating a horizontally reciprocable slide 38, as shown in Figure 3. This slide 38 is also provided on its outer end with bearing 40 having a vertical pin 42, to the lower end of which is pivoted a link 44. This link 44 carries at its outer end an arm 46, the outer bearing 48 of which is pinned to a vertical oscillatable shaft 50, which is mounted in the corner post 6 of the frame opposite the vertical shaft 36. This shaft 50 has affixed to its upper end an arm hereinafter referred to, which, in turn pivotally connects at its outer end to a relatively long rod running diagonally across to a universal connection which is, in turn, connected to a mechanism that operates a sector gear reciprocable about a horizontal axis for operating the mechanism which actuates the pitting knives, the details of which are also herein omitted.

Cam race 26b operates a vertically reciprocable slide 52 (Figure 6, our Patent 2,398,780), the upper end of which is provided with a rod 54 having a rack tooth portion 56 operating a pinion 58 on a horizontal shaft 60. This shaft 60 has on one end a bevel gear 62 which, in turn, operates bevel gear 64 on shaft 66 having bearings on the outside of the vertical frame member and on the same level as the main fruit cup turret hereinafter described, which turret is above that lower level of the machine at which the shafts 14 and 16 are located. The shaft 66 operates the mechanism for positioning the auxiliary fruit holding means, specifically the pad, over the fruit cup, for holding the half fruit from tilting during peeling and also for oscillating the fruit discharging means, ejecting the processed half fruit from the machine.

A second level of the main rectangular frame of the machine bounded by the uprights 2 to 8, inclusive, provides the location for the Geneva gears for driving the main or half fruit-holding turret, and also the whole fruit turret, including the driving means therebetween, whereby the main or half fruit holder turret is driven at twice the speed as the whole fruit turret. To effect this function, the shaft 14 carries between its ends a bevel gear 110 (see Figure 3) meshing with a bevel gear 112 on a vertical shaft 114 mounted in the bearing 116 carried by a cross frame 118. This cross frame is supported at one end by suitable vertical brace connected to a cross bar 120 (see Figure 5), in turn carried by the vertical upright frame members 4 and 8. The opposite end 122 of cross frame 118 is bolted to an end support by a projection 124 from a horizontal cross bar 126 carried by the opposite vertical uprights 2 and 6 of the main frame at about the level of the cross frame 118. This cross bar 126 is preferably an integral part of the substantial triangularly shaped supplementary frame carrying the whole fruit turret.

Shaft 114 carries a bevel gear 112 and also carries above it a gear 128, which latter meshes with a second gear 130 on a bearing 132 on the cross frame 118. Gear 130 meshes with the larger gear 134 horizontally fixed on vertical shaft 136 having a bearing in cross frame 118. Turret shaft 136 is surrounded by a bearing 138, above which is a long sleeve 139, along which is fixed a Geneva gear 140 having slots cooperating with a Geneva member 142 on shaft 114. This latter Geneva member 142 has a circular periphery on which is mounted roller 144 for cooperation with the radial slots of gear 140 aforesaid for intermittently rotating sleeve 139 and for holding it stationary between partial turns. The upright shaft 114 above the Geneva member carries a sprocket gear 146 (see Figure 5) driving a chain 148 running horizontally across the frame of the machine to a larger sprocket 150 fixed to shaft 152. This shaft is mounted upon a substantially triangular frame 153 carried by and integral with the cross bar 126. The frame 153 carries a bearing for the shaft 152, and also has a heavy extension bearing 154 for the whole fruit turret shaft 155. Both of these shafts are vertical and parallel to each other. The whole fruit turret shaft 155 extends vertically upward toward the top of the frame. The shaft 152 has pinned thereto just above the bearing 153 a part of the Geneva, this part carrying the roller 158.

In addition, the shaft 152 has pinned below the support 154 a gear wheel 159 which meshes with another gear 156, which is pinned to the bottom of the shaft 155. Just above the gear 156, cam 160 is pinned to shaft 155, and above the bearing 154 the shaft 155 carries a relatively long sleeve 161 to which is keyed the cooperative part 162 of the Geneva, whereby, through the intermediary of the Geneva 162, the sleeve 161 is intermittently rotated. Sleeve 161 carries the whole fruit feed turret.

*Whole Fruit Feed Station and Orienting Means*

In accordance with the present invention initial feeding and orienting means is provided for the fruit whereby an operator may feed whole peaches one at a time to the whole fruit holding mechanism carried by the whole fruit turret, and such mechanism comprises orienting means and automatically shiftable means preferably including a concave receiver, into which a whole peach is placed by the operator, so that the stem indent and suture plane of the whole fruit is precisely and definitely located with respect to this receiver, whereby upon the shiftable operation of this feeding mechanism or receiver, the whole peach is properly oriented both as to stem indent and suture plane, and also automatically conveyed to whole peach gripping means preferably in the form of spaced fingers or jaws which are adapted automatically to grip the so oriented whole fruit adjacent and on substantially opposite sides of the suture plane of the whole fruit, and thereafter firmly to hold the whole fruit in the precise position in which it was placed in the first mentioned whole fruit receiving means. Thereafter this whole fruit gripping means is turned by the turret mechanism carrying it to a plurality of stations provided with mechanism for operating upon the peach while thus precisely held.

Direct positioning and orientation of the whole peach in the machine and the maintenance of control of a certain alignment with respect to the suture plane and stem cavity is very important for efficient results obtained from successive processing operations on the peach while it is fed through the machine. It is undesirable to provide feeding mechanism which gives the operator any particular leeway in properly placing the peach in the feeding jaws of the whole fruit turret, and therefore the hereinbefore described means is provided for eliminating all chance and guesswork by the provision of means whereby the operator merely places the stem cavity of the whole peach over a locating means, and in the construction of the whole fruit receiver with concaved walls, whereby the rounded body of the peach automatically aligns its suture, so that subsequent operations may be exactly determined.

In the present invention, means is provided whereby relative motion between the whole fruit and its orienting means is effected and more particularly during the orienting operation so as to bring the fruit and its orienting means into proper registration both as to stem indent and as to the suture plane indent of the fruit. More specifically, and as will hereinafter be pointed out, orienting means is provided having a longer axis and a shorter axis of predetermined character and kind in respect to the longer axes and shorter axes of the stem indent of the fruit such as a peach to be oriented in connection with the free or loose supporting of the fruit and the orienting means in respect to each other and in connection with a pressure engagement therebetween, whereby to effect the shifting of the fruit in respect to the orienting means both with reference to its stem indent and with reference to its suture plane to effect both the suture plane and stem indent shifting orientation of the fruit while thus loosely supported, for delivery to fruit sensing or inspecting means which is thereafter automatically operative to determine whether or not the fruit has been properly oriented as to its suture plane and this sensing and inspecting mechanism is constructed and arranged automatically to control means for determining whether or not the fruit is thereafter conveyed to processing mechanism such, for instance, as a fruit bisecting means.

More specifically, the means for orienting the fruit as to its stem indent and also as to its suture plane indent and means for causing relative movement between the whole peach and its orienting means, is constructed and arranged to operate in conjunction with means whereby the whole fruit may be positioned approximately in a predetermined position by an operator and thereafter automatically fed to fruit holding conveying and gripping jaws or other equivalent means which operate to carry the fruit to the inspecting or sensing mechanism heretofore described, and means is provided in association with this movable whole fruit receiver and feeding mechanism for effecting relative movement, whereby to cause the exact registration of the stem indent and more specifically the long axis of the stem indent with a preformed long axis of the orienting means, whereby to effect complete registration of said long axes and thereby effect proper orientation of the suture plane of the whole peach or other fruit having such shaped indent or to any other fruit having a properly formed stem indent.

The outer end of the block 171 carries means for orienting the stem indent and suture plane of the whole fruit. This comprises orienting means for supporting and orienting the fruit, which means has a relatively longer axis and a relatively shorter axis, and is provided with a peach contacting surface, which along said relatively longer axis has a radius of curvature greater than the radius of curvature of the peach stem indent transversely of the longitudinal axis thereof; and, in addition, this stem indent and suture plane orienting means has its maximum depth of penetration into the peach stem indent when the longer axis thereof is aligned with the longitudinal axis of the stem indent. It is to be understood that the radius of curvature of this long axis surface of the suture plane orienting means may be infinite, viz., the orienting means may be a flat surface provided it has also the other characteristics hereinbefore just recited.

More specifically, in the present instance this fruit stem indent and suture plane orienting means comprises a substantially centrally located, elongated member 174 lying within a cup 175, said member being designed to fit loosely and freely, yet substantially to conform with and project into the longitudinal axis of the stem indent or cavity of the whole peach. When thus aligned, and with the whole peach resting thereon in the position shown in Figure 7 of the drawings, the whole peach will settle down onto the orienting member 174 and said member will project into the stem cavity to a maximum degree. In any nonaligned peach, the orienting means 174 will project only partially into the stem cavity when the stem indent registers generally with the orienting means 174 but does not have the long axis of the stem cavity aligned with the long axis of the orienting means 174.

In addition, on opposite sides thereof, the cradle is provided with concaved or rounded walls which are substantially cup-shaped. These walls at the rear are cut away as shown at 176, so as not to interfere with the opening and closing movements of the lower whole fruit holding fingers or jaws, as shown in Figure 8. It will be noted that the angle arm 168 is arranged so that, when in position to place the whole fruit between the holding jaws hereinafter referred to, the stem axis of the whole peach is angularly disposed with respect to a horizontal line passing through the center of the whole fruit receiving means. Specifically the stem axis is downwardly inclined about 30 degrees to such line. This is particularly important because, as the whole fruit is carried by the gripping means of the whole fruit turret, it must be maintained in this exact position.

The central longitudinal axis of the orienting means 174, as shown in Figure 2, is not only in alignment with the radius of the whole fruit receiving turret 177 but also with the radius of the turret 452 whereby once the suture plane of the whole peach is properly registered and lined up with the vertically disposed central longitudinal plane through the long axis of the orienting means 174 the whole peach thus oriented will be fed to the whole fruit gripping jaws which will grip the peach on opposite sides of the suture plane and hold it thus oriented. Thereafter upon partial rotation of the whole fruit turret 300 the peach maintained in this oriented position will be carried to the bisecting or sawing station wherein the saw 376 has its plane of rotation disposed radially of this same turret 300 so that as the saw acts upon the oriented peach the saw will cut through the suture plane of the flesh and pit of the peach. Thereafter as will hereinafter be set forth, the sawed halves of the peach thus held together with their suture planes properly oriented will be carried to the main turret 452, and be deposited in the half cups in such a manner that the suture plane will lie substantially flush with the top of the cup and the long central axis of the pit will lie radially of the turret 452 and also extending radially of the division lines of the two cup sections, and will also extend radially of the turret 452. A slide carrying the two pitter blades P, as shown in Figure 2, is situated so that in the pitting of each half pit section the two pivotally swinging pitter blades will move about axes parallel with the long axis of the pit and will cut around the long curved marginal edges of the pit, meeting on the underside of the pit whereby cleanly to sever the pit from the flesh of the half peach.

It will thus be seen that the receiver 175 and particularly the orienting or positioning member 174 provides orienting means for effecting the orienting of the whole fruit, and specifically a whole peach, both in respect to its stem indent and suture plane prior to and as the fruit is conveyed and introduced into the transferring or conveying mechanisms of the machine, now to be further described. It will be noted that the slope of the receiver walls, the character of the orienting member 174 which is shaped to lie within and extend longitudinally of the peach stem indent along the suture plane, and the movement of the receiver causes the fruit to be oriented both in respect to its stem indent and suture plane, whereby subsequent cutting and processing operations will be properly effected in respect thereto, as will presently appear.

In addition to the foregoing orienting means for positioning the suture plane of the whole fruit in a predetermined plane, means is also provided for shifting the orienting means 174 relatively to the whole peach while the whole peach is supported on said orienting means 174.

In the manual feeding of peaches to the present machine, an operator is required quickly to place a succession of whole peaches one after another on the cradle or whole fruit receiver 175. In the normally intended operation, the operator attempts to place each peach so that the long axis of the stem indent will overlie and fit exactly on and over the long axis or the orienting means 174. In numerous cases due either to fast feeding conditions or inaccuracies or indifferences the peach may be placed on the orienting means 174 so that its long axis does not exactly coincide with the long axis of the stem indent of the peach. In instances the long axis of the stem indent of the whole peach and the long axis of the orienting means may be angularly disposed or in those cases where such two long axes do register, still due to slight projections, bumps or abnormalities in the side walls of the stem cavity the suture plane of the peach may be slightly tilted out of a vertical plane through the central longitudinal axis of the orienting means 174.

In order to cause correct registration of the stem indent or the long axis of the stem indent of the peach with the long axis centrally of the orienting means 174 and to cause a plane passing diametrically through the peach and through the long axis of the stem indent to register with a plane passing vertically through the central longitudinal axis of the orienting means 174 whereby correctly to orient the suture plane radially vertically of the whole fruit receiving turret 177 and passing between the two pairs of whole peach holding jaws as seen in Figure 9, means is provided for relatively shifting the orienting means 174 and the whole peach supported thereon in a manner to cause the two long axes of the stem indent of the peach and the central long axis of the orienting means to shift angularly relatively into exact registration and/or also to cause the peach to shift from tilted position into true vertical position with the suture plane thereof lying in said vertical radial plane of the turret 177 as aforesaid.

This function is accomplished in the present device by forming the cam 160 with relatively small projections or rough surfaces 169 in the cam race in which the roller 165 works. Preferably the cam 160 is formed as a cast iron cam having inherent roughness in the cam track or race whereby vibration is imparted by such roughened surface to the roller 165. This vibration is considerably multiplied, approximately on a six-fold basis by means of the lever 163, the arm 166, lever 168 to the receiver 175. Thus an additional movement or vibration is imparted to the orienting means 174 upon which the whole fruit is placed. By thus supporting the whole fruit on the orienting means 174 while imparting vertical movement or vibration to this orienting means 174, the peach is vibrated sufficiently so that misplacement of the peach upon this orienting projection 174 will cause the peach to shift or turn about a vertical axis, and angularly relatively to the longitudinal means 174 so that the long axis of the stem indent of the peach will come to aligned position with the central longitudinal axis of the longitudinal means 174. Furthermore, in the event that peaches have slight projections, these bumps or creases on the side walls of their stem indents would otherwise prevent the peach from settling down on the orienting means 174. It will be found that such abnormalities on the side walls of the stem indent will cause the suture plane of the peach to be slanted a slight amount to the vertical plane through the central longitudinal axis of the orienting means 174. It has been found that the vibration imparted to the peach in the manner aforesaid will vibrate the peach sufficiently so that the orienting means will pass by these bumps, projections or creases and the peach will settle down to its maximum extent onto the orienting means 174 and therby cause the suture plane of the peach to swing toward the vertical plane and hence to coincide with the vertical plane through the central longitudinal axis of the orienting means whereby each successive peach is positioned and properly oriented with its suture plane vertical and aligned with the plane passing centrally of and through the long axis of the orienting means. Hence during this vibration as the oriented peach is conveyed by upward movement of the lever 168 from the position shown in Figure 7 to that shown in Figure 8, and the peach placed between the four jaws of the whole fruit turret, the peach will be oriented and positioned so that its suture plane is disposed vertically and aligned centrally of the four jaws and radially of a vertical plane passing between said jaws and radially of the whole fruit turret 300.

Once the long axis of the stem indent registers with the orienting means 174 said means will project to maximum extent into the cavity forming the long axis of the stem indent so further vibration will not dislodge this registration, and hence the suture plane will remain properly oriented.

Hence the fruit thus properly oriented is positioned between and held by the holding jaws and is carried through the machine at such proper oriented alignment of the suture plane so that subsequently when the hereinafter mentioned cutters 294 operate they will cut in a predetermined manner with reference to the suture plane of the peach and so also when the peach is passed to the saw mechanism the plane of operation of the sawing mechanism will coincide with the suture plane of the oriented peach and the saw will sever through the whole peach substantially on and through the suture plane of the peach.

*Whole fruit conveying mechanism*

Referring now to the turret proper and to the fruit holding jaws, it will be observed that the intermittently rotatable sleeve 161 carries an additional sleeve 177 and affixed thereto are a plurality of post supports 178, such supports being radially spaced around the central vertical axis of the turret. Each one of these supports 178, in turn, is provided with an upright extension upon which the whole fruit holding jaws are mounted. By reference to Figures 6 to 16, inclusive, the construction and operation of these jaws will be apparent. The lower jaw 181 is pivoted as at 180 to the upright 178. This lower jaw is formed with two integral spaced jaws or fruit gripping fingers 181, which have concaved portions 182 and 183 adapted to engage the curvilinear contour of the whole peach on opposite sides of a plane passing substantially vertically through the plane of the suture, as shown in Figures 15 and 16.

In addition, this lower jaw 181 is provided at its rear end with an angularly disposed tooth projection 184, and is provided with a connection 185 with a coil spring 186 as hereinafter set forth. The upper jaw is made in two pieces, whereas the lower jaw is preferably made in a single piece. The details of construction of the upper jaw are shown in Figures 13 and 14. This upper jaw comprises a head portion 187 centrally apertured as at 188. The head is provided with a lateral lug 189 hereinafter referred to, and with an operating roller 190 on its upper portion, and a vertically extending tooth arm 191, the teeth of which mesh with the teeth of the arm of the lower clamping jaw of the whole fruit holding mechanism. In addition, the head portion 187 is provided with a laterally extending fruit clamping jaw 192 having a curvilinear fruit contacting face 193 for engaging the contour of the peach on one side of the plane of the suture. In addition, this jaw is provided with an upstanding lug 194, to which the upper ends of the spring 186 connect. The cooperative part of the upper jaw is formed with a round bearing 195, which easily fits within the opening 188 of the head 187 to permit relative angular movement between the parts. This head is provided with a furcation in the form of a rearwardly extending lug 196, which is adapted to receive the lug 189 therebetween that is formed on the cooperative portion of the first portion of the upper gripping jaws. In addition, this part of the jaw is provided with a forwardly extending gripping portion 197, which is arcuately curved as at 198 to grip the contour of the peach on the opposite sides of the suture planes, as shown in Figures 15 and 16. The furcation 196 and the cooperating lug 189 provide a lost motion connection, which permits two portions of this upper jaw to have vertical adjustment, as shown in Figures 15 and 16, whereby in the event a peach is held, which is of smaller diameter on one side of the suture plane than the other, the upper gripping jaw will adjust itself accordingly, whereby to hold the peach precisely as it is inserted between these jaws when they move together under the tension of the closing springs 186. There are a pair of springs for each jaw, one on each side of the vertical plane through the central portion of these jaws, the upper ends being attached to the pins 194 and the lower ends of the springs being attached to the pins 185 of the lower jaws. It will be noted that the holding portions 181, 181' of the lower jaws and the portions 192, 197 of the upper jaws are spaced apart to permit the entry of the saw 376 therebetween in the subsequent cutting operation of the peach through its suture plane, presently to be described, so that the saw may completely sever the entire peach and its pit while held in these jaws. It will be further noted that this space between these fingers 181, 181' and 192 and 197 lies in the suture plane of the peach, which is approximately the plane of the maximum diameter of the peach, or parallel thereto.

Means for operating the jaw mechanism of the whole fruit holding means comprises a cam 200 which is splined to the upper end of the shaft 155. This cam is provided with an internal camway adapted to receive a roller 202 mounted upon a slide 204 disposed immediately beneath the cam and lying transversely across the shaft 155. The slide is suitably slotted as at 206 (see Figures 6 and 12) to permit movement of the slide back and forth transversely across the axis of the shaft 155. The slot is adapted to move in guideways 208 fixed to the extension support of the machine. The bottom portion of the slide is provided with two depending lugs forming extensions thereon. These lugs are 180 degrees apart. The cam race 202 of cam 200 extends 360 degrees of a total annular travel of the cam. When the slide 204 is moved toward the feed-in station, i. e., away from the main or half fruit turret, the depending lug nearest the main turret moves toward the feed-in station, and thereby pushes the roller 190 on the top of the upper finger of the corresponding whole fruit jaws inwardly toward the shaft 155, thereby positively to open these fruit jaws. Simultaneously, the opposite lug 210, which is spaced 180 degrees therefrom, moves in the same direction to permit the spring 186 to close the oppositely located fruit clamping jaws about or into engagement with a peach positioned by the fruit receiving saddle 175, and thereby hold the whole fruit firmly between the fingers of the jaws. Any variations in size of successive peaches are automatically compensated for by the yielding action of the springs 186 between the upper and lower clamping jaws, and any deviations in size on opposite sides of the plane of the suture of the peach are compensated for by the relative movement between the members of the upper fruit jaw.

The upright 178 on turret 177 has rigidly bolted thereto as at 212 a laterally projecting backing member 214, which is shaped as shown in Figure 8 thereby to position and firmly to hold the rear portion of the peach positioned between the clamping jaws by the whole fruit receiver 175.

By reason of the foregoing construction, the whole fruit turret is intermittently rotated to position each pair of fruit holding jaws at the receiving station, during which time the jaws are automatically held in open position while a whole peach is fed onto the peach-receiving cradle 175 in a manner hereinafter set forth, and thereafter the receiver 175 is moved upwardly to position the peach, as shown in Figure 8, during which time the upper and lower jaws of the clamping members are cam released so as to resiliently approach the peach to grasp and hold it firmly and precisely in the before described predetermined position.

At the same time that the turret is moved, the shaft 155 is synchronously driven to operate automatically the cam and slide hereinbefore mentioned to cause these proper opening and closing movements of these jaws in timed relation.

Further referring to the foregoing mechanism, once the whole peach is placed manually with the long or suture plane axis of its stem cavity registering with and oriented by the positioning nib 174 of the fruit cradle, as illustrated in Figure 9, the whole peach will thereafter be raised upwardly to the position shown in Figure 8, with the stem axis downwardly inclined from the horizontal, as therein shown, and with the suture plane in predetermined position. At this time the whole fruit jaws firmly grasp the fruit as hereinbefore set forth, whereupon the fruit-receiving cradle moves downwardly, the turret then automatically shifts to the stem cavity trimming station; and at the same time an empty set of whole fruit holding jaws is brough into registration ready for the next upward movement of the whole fruit receiving cradle.

It will thus be seen that the whole fruit conveying means cooperates with the orienting means in the in-feed station to preserve the orientation of the fruit, both in respect to its stem indent and its suture plane, as the fruit is presented to processing means now to be described.

*Means for controlling processing of peach in accordance with determination of the sensing or inspecting member.*

In addition to the peach orienting mechanism hereinbefore described, particularly the suture plane orienting mechanism, due to varations in the sizes and shapes of peaches, and other factors of variation in accordance with the present invention, additional peach stem indent and suture plane mechanism, specifically in the form of suture plane sensing or suture plane inspection and control, means is provided as will now be described, such last named means forming a part of control means for controlling the operation of the peach processing mechanism, specifically a cutting means upon the peach in predetermined reference to the peach stem indent and suture plane and likewise controlling the determination of whether or not the peach is to be bisected, depending on whether or not the suture plane of the peach is properly oriented. This latter sensing mechanism as specifically herein disclosed comprises in particular, but not in a generic sense, a rotatable wheel adapted to have movement relatively to the whole peach and to roll relatively along the peripheral convex surface of the whole peach and then move yieldably into the long axis of the stem indenture when such long axis or the suture plane axis of the stem indenture registers with the plane of rotation of the wheel.

The entering movement of the wheel which corresponds to a relative bodily movement of the wheel with respect to the peach, forms a part of control means for controlling the operative functioning of the peach cutting means, and more specifically inhibits the effective operation thereof when proper entry is not made, the sensing means thus additionally serving as a rejecting or inhibiting mechanism for precluding the effective operation of the cutting means upon the peach when the peach in reference to its stem indent and suture plane is not properly positioned. The sensing wheel is of sufficiently large diameter with regard to the dimensions of the longitudinal or suture plane axis of the stem indent whereby when relative motion is produced between the rotatable wheel and the whole peach, and the wheel comes in contact with the convex curvature of the whole peach and then subsequently comes into registration with the stem indent of the whole peach, the wheel due to its said radius of curvature will enter radially into the stem indent to a maximum depth when the wheel registers with the longitudinal or suture plane axis of the stem indent, but not otherwise. When the wheel-like sensing member fails to enter the stem indent, or enters the stem indent in a position angularly disposed in respect to the suture plane, the operative functioning of the processing mechanism of the machine, specifically a cutting means as herein disclosed, is varied and appropriately controlled.

Referring specifically to the mechanism herein disclosed, the rotary wheel sensing means is or may be associated directly with stem cavity peeling means disposed at a stem cavity peeling station. The present mechanism is designed efficiently to remove the peeling from the stem cavity of the whole peach, in reference to its suture plane and elongated shape. Experience has shown that in the majority of peaches the stem cavities are of elongated shape and not round, it therefore being desirable that the peeling operation be effected in predetermined reference to the suture plane of the stem cavity.

In the present instance the stem cavity peeler is disposed to operate upon the whole peach while the latter is held in the whole fruit turret, and is the first station of the mechanism operable upon the whole peach while in the holding jaws of this first turret. The mechanism for removing the stem cavity and peeling is shown in the drawings.

Referring particularly to Figure 1, mounted on the top of the frame 12 is a motor 216, which drives a belt 218 to pulley 220 on the shaft 222. This shaft, in addition carries a worm gear 224 driving another gear 226 (see Figures 1 and 18) on a vertical shaft 230. This shaft 230 is connected by means of a universal joint 232 to a telescopic shaft arrangement 234, which has pinned to the lower portion of the telescopic shaft arrangement a bevel gear 236. This telescopic shaft arrangement includes a driving key 238 of usual construction, and a spring 240 is provided to cause a more positive downward motion of the cutter assembly. Since the cutters 288 rotate counterclockwise as shown in Figure 17, there is a tendency for the cutters to create an upward thrust to the assembly, providing the spring 240 overcomes this. A shaft 230 permits relative reciprocation of the movable portions of the telescopic shaft, while at the same time permitting a swinging movement of the cutter mechanism driven by the miter gear 236 which is secured to the shaft 234.

In addition to the telescopic shaft 234, there is provided a swinging frame arrangement adjacent thereto comprising a bracket 242 rigidly mounted upon a support portion 244 of the main frame. This bracket 242 includes an outstanding pin-like bearing 246, upon which a hub portion 248 of a mounting is adapted to oscillate. This hub portion 248 has a depending socket 250 having a depending shaft 252 affixed thereto as at 254. The bottom portion of this shaft 252 has slidably, adjustably affixed thereto a carriage 256 (see Figure 19). The upper portion of this carriage is provided with a smaller sleeve 258 carrying a pin 260, on which a pair of rollers 262 are mounted. The lower portion of the carriage carries a ring-like member 264 having a depending bracket 266, which, as shown in Figure 18, comprises arms 268 and 270 and a sleeve-like support 272 for the bottom portion of the telescopic shaft 234. The central arm 270 has a lower portion 276 forming at its bottom end a bearing 278 for the bottom portion of the telescopic shaft arrangement 234. Mounted in the arms 268 and 270 of this lower carriage is the shaft 280, to which is affixed a bevel gear 282 for driving the same from the bevel gear 236. Also mounted upon this shaft 280 between the arms 268 and 270 is the peeling cutter arrangement comprising stem cavity and suture plane sensing member 283, preferably formed as a wheel or disk, and having oppositely disposed hubs 284 which are loosely mounted upon the shaft 280. This wheel 283 is rotatably mounted so that it can roll on its shaft down into and out of the stem cavity, carrying with it a pair of rotating cutter blades 288 and 290. By thus mounting the disk 283, sawing or cutting of the fruit is prevented unless the stem indenture is in a predetermined position, and the character of the cutting operation is controlled in accordance with the position of the suture plane. Adjacent each hub 284 is a collar 285 and 286, which are keyed to the shaft 280 and form a support for said cutter blades 288 and 290, which are of the general configurations shown in the drawings, and are attached to the collars 285 and 286 by means of the screws 292. It will be noted that the cutter members are staggered 180 degrees, so as to counterbalance the high speed rotation of the cutter shaft. Each cutter comprises generally concaved portions 294 on opposite sides of the wheel 283, and because of this opposite arrangement of these concaved portions of the cutters in combination with the wheel 283, which is adapted to roll in the suture plane axis of the central portion of the peach cavity, the cutters as they rotate will completely and precisely cut and sever the peel from the stem cavity.

Means is provided for oscillating the cutter about its swingable bearing pin 246, and, in association therewith, there is provided a cam mechanism to give the cutter a definite swinging movement. By reference to Figure 17 it will be seen that means is provided to place the stem cavity peeling cutters in position so as to partake of a swinging movement resiliently or yieldingly inwardly toward and into the stem cavity of the peach, and also a positive displacement movement away from the stem cavity of the peach and/or substantially up-and-down or vertical, reciprocatory movement longitudinally of the longer or suture plane axis of the stem cavity.

Referring particularly to Figure 2, mounted upon the whole fruit turret shaft 155 at the top thereof is a cam 300 which is pinned to shaft as at 302. This cam is provided with a camway 304 shown also in Figure 6. Slidably mounted transversely of the shaft 155 is a slide 306, which is slotted as at 308 to permit such movement of this slide. Such slide carries on its upper surface a roller 310 which operates in the cam slide 304, whereby upon rotation of the shaft 155, the slide is reciprocated in the manner shown in Figure 2. This slide at one end carries an operating arm 312 provided with a roller 314. This roller is adapted to contact a vertical plate-like member 316, which is mounted upon the pivoted member 250, which swings with the assembly. A depending arm 318 having a cam portion 319 formed on its lower end, is pivotally mounted at 320 on the rigid portion of the support 242, and it is provided with an inwardly extending shorter arm 322 adapted to be disposed between upper and lower screws 324 and 326, and by means of their adjustment are adapted to determine the position of the cam portion of the arm 318, whereby to determine the adjustment of the movement of the cutter as it approaches the peach stem cavity. Cam member 319 is adapted to contact one of the rollers 262 carried by the sleeve 256 on the swingable shaft 252 which in turn carries the cutters, whereby to prevent the cutters contacting the jaws 181, if no fruit be therebetween. The foregoing roller 314, in cooperation with the plate 316, positively forces the wheel 283 and the cutters out of contact with the stem cavity so as not to interfere with the movement of the whole fruit turret and the whole fruit holding means. On the other hand, a coil spring 328 has one end attached as at 330 to a ring 332 pinned to the depending sleeve 256, and has its opposite end fixed to a pin 334 on an actuatable arm 336 in turn fixed to an oscillatable shaft 338 hereinafter referred to, whereby the spring 328 constantly tends to draw the swingable stem cavity cutter and sensing wheel yieldingly toward the peach when the slide 312 and its roller 314 swings to the left, as viewed in Figure 17.

In addition to this movement, means hereinbefore referred to is provided for raising and lowering the sensing wheel and cutting mechanism in synchronized relation to the inward swinging movement of the parts toward the stem cavity. This is accomplished by the mechanism in Figures 17, 19, 20 and 21. By means of this arrangement, when the rod 252 is oscillated laterally by the roller 314 on the plate 316, and by means of the spring 328, the rod will shift the entire frame or support 266, which carries the wheel and cutter head, while at the same time the sleeve 256 carrying the parts may be shifted vertically with respect to the rod 252, due to the slot and block arrangement therebetween. The means for vertically raising and lowering the sleeve 256 carrying the cutter head and wheel 283 comprises the bar 336 hereinbefore described, which, when actuated, is adapted to raise and lower the sleeve 256 by means of contact with one of the rollers 262 thereon. The shaft 338 that actuates the bar 336, as shown in Figure 2, is provided at its opposite end with a roller 348, which is shifted by a cam 452 mounted on the shaft 135. Likewise, the sleeve 234 on the telescopic shaft 232, Figure 18, will be raised and lowered vertically with respect to the sleeve 234, and it also will be retained in vertical alignment by the abutment 238 riding in the slot formed on the sleeve 234.

If desired, the means for giving the carriage 266 a vertical, reciprocatory movement, may be omitted, and merely the swinging movement may be imparted to the carriage. It is preferred, however, to give the combination of movements. It will be appreciated that, inasmuch as the elongated stem cavities of successive peaches vary in length and depth, the sensing wheel is provided to roll down through the cavity, allowing the opposed cutters to do the peeling, regardless of the length or depth, and in conformity with the shape of the stem cavity. The vertical movement and the swinging or oscillatory movement are independent of one another but in timed relation.

In accordance with the foregoing it will be seen that the spring 328 resiliently or yieldingly pulls the sensing wheel 283 and the peach relatively toward each other, while at the same time the wheel is given a vertical upward movement through the action of the power actuated arm 336, whereby the sensing wheel is caused to roll relatively along the convex surface of the peach and into and through the suture plane axis of the stem indent if and when the peach is in proper predetermined position.

The stem indenture of the peach in the direction of the suture plane axis merges smoothly and relatively flatly at each end with the convex surface of the peach, whereas in a direction transverse thereto the indenture is bordered by high shoulders merging relatively abruptly with the convex surface of the peach and dropping abruptly into the stem indenture. The curvature of the sensing wheel 283 is so predetermined that the wheel will roll into the stem indenture substantially to the bottom thereof when in registration with the suture plane axis of the indenture. However, if the whole peach is incorrectly positioned in the jaws 181 and 197 so that no stem indenture comes into registration with the sensing wheel no cutting action will occur; or alternatively if the peach is held so that other than the suture plane axis of the stem indenture comes into registration with the plane and path of movement of the sensing wheel the wheel will not enter the stem indenture to an appreciable extent and likewise no effective cutting action will occur.

Applicants have thus provided in the wheel 283, an inspecting or sensing device which senses the position of the peach both with reference to its stem indent and its suture plane, and which senses or inspects and positions the peach and processing cutters 294 in respect to each other and in respect to the peach stem indent and suture plane so that a predetermined processing operation in respect thereto occurs. While the sensing wheel 283 has been specifically disclosed herein in connection with the control of the processing cutters 294 for peeling the stem indent, it is to be understood that a rotatable sensing wheel such as the wheel 283 which rolls relatively to the peach along its peripheral surface, and then into the peach stem indent and further becoming aligned with the suture plane axis thereof, may be variously used as an inspecting member or sensing and/or control to effect the sensing and/or control of a peach and its processing mechanism relative to each other so as to effect the processing of the peach in a desired predetermined manner in respect to its stem indent and suture plane. A rotatable sensing wheel which rolls relatively circumferentially of the peach while the wheel and peach are yieldably radially urged toward each other, and which is shaped so as to enter the stem indent in one manner when in alignment with the suture plane, and in a distinguishably different manner when not in alignment with the suture plane, thus serves advantageously and effectively particularly as an inspecting or sensing member for peaches and like fruit, wherein orientation of the suture plane as well as in respect to the stem indent is a factor of importance, as distinguished from the orientation of cherries and fruit of like character.

As the peach leaves the stem cavity peeling station, it is transferred by the whole peach conveyor to the bisecting means, more specifically the cutting saw 376 which operates to bisect the peach into substantially equal size half portions. It will be seen, particularly by reference to Figs. 12, 25 and 26, that the sensing wheel, the bisector and the whole peach conveyor are so constructed as to maintain the suture plane of the fruit in the same position relative to the plane of the sensing wheel 283 and the plane of the cutting saw 376, although the wheel and saw are in specifically different planes relative to each other. By this means it will be seen that those peaches which are properly positioned as engaged by the sensing wheel will be maintained in proper position by the conveyor between the sensing wheel and the cutting saw so that the latter effects the bisecting of such peaches substantially along the suture plane thereof, and longitudinally of the peeled stem indent.

After the severing of the peaches the peach halves are transferred from the whole fruit conveyor to the half fruit conveyor more particularly shown in Fig. 2, and subjected to further processing operations, specifically the pitting operation shown at P on Fig. 2 of the drawing and the details of which are disclosed in our prior Patent 2,398,780, issued April 23, 1946, and Patent 2,280,813, issued April 28, 1942, and its divisional application Serial No. 430,840, filed February 14, 1942, now issued as Patent 2,388,682 of November 13, 1945.

*Suture plane orientation inspector and means operated thereby for preventing bisecting of fruit if not properly oriented as to suture plane*

In combination with the foregoing structure there is provided means operable on the peach while supported, and more specifically, means to rotate along the periphery of the peach and to enter to maximum extent into the long axis of the stem indent of the peach for the purpose of determining whether or not the peach shall be further processed. This means operates so that if the suture plane of the peach acted upon by the means is properly oriented as to suture plane, then the peach will be conveyed to peach bisecting, and thereafter, if desired, to peach pitting means. If, on the other hand, the peach is not properly oriented as to suture plane, means will be operated for precluding the bisecting and/or subsequent pitting of that peach. More specifically the peach will not be fed or transferred to the peach bisecting means so that the peach will not be mutilated but can be recovered and put through the machine again. In the one aspect of the invention this means comprises the rotatable sensing wheel 283 that has heretofore been described as an inspecting means for the long axis of the stem indent of the peach. In the present aspect of this construction it comprises in combination with a sensing or determining means for determining the proper positioning of the long axis of the stem indent of the peach and for utilizing the proper orientation of the long axis stem indent of the peach for actuating mechanism for determining whether or not the peach shall be further fed to the peach bisecting means. In this aspect of the invention the cutting members 288 and 290 are not material and need not be used. Referring to Figures 17 to 24 for carrying out this part of the invention, a plate 402 is secured to the bearings 278 which have journalled therein the shaft 234, see Figures 17 and 18, and this plate is provided with slots 404 and 406. Another plate 408 is slidably mounted upon this plate 402 by studs 410 and 412. Stud 410, which is fastened in the plate, supports a spring 414. The other end of the spring is supported by the ear 416 which is secured to the plate 402. This causes a downward urge to the plate 408 but allows the plate 408 to move upwardly in the slots 404 and 406 when certain actions hereinafter disclosed take place. The bottom end of plate 408 carries the arcuate strap 416 which has its arcuate center in the stud 246. Secured to the frame 303 is a depending arm 418 which has secured to its lower end the microswitch 420. The latter has the contacting lever 422 projecting therefrom. Secured to the stationary frame 244 is the depending arm 424 on which is pivotally mounted the solenoid 426 by means of the pivotal stud 428. Pivotally mounted on the stud 260 is a collar 430 which has pivoted thereto the solenoid core 432.

Secured to the stationary frame 303 is also a dependable arm 434 which has in turn secured to its lower end the solenoid 436. Fastened to the solenoid core 438 is a right angle lever 440 which acts on roller 190.

Two electric wires 442 and 444 pass to a master switch 446. Wires 448 and 450 are passed to both the solenoids 426 and 436. Hence if electric contact is made in the microswitch both solenoids will be simultaneously energized. When the wheel 283 rolls over the periphery of the peach, if the long axis of the stem indent is not in registration with the plane of rotation of this wheel, the wheel will not enter the stem cavity to its fullest depth and in the action of the mechanism the plate 416 will strike the contact lever 422 of the microswitch, causing the contact in the electric circuit which energizes the solenoid 426 to swing the assembly out away from the peach and the solenoid 436 will act on the roller 190 to open the jaws 181 and 192, thereby allowing the peach to roll out as shown in Figure 24 of the drawing. The solenoid 426 will hold the assembly out until the roller 314 contacts the plate 316 at which time the assembly is raised, thereby disconnecting the electrocontact and the solenoids are thereafter deenergized. However, if the peach be properly oriented as shown in Figures 17 to 21, the wheel 283 will roll to maximum extent into the long axis of the stem cavity and accordingly on the further action of the device the end 452 of the plate 416 will pass by the contact lever 422 and no action will be taken by the solenoids, so that when the assembly is swung out by the action of roller 314 the opposite end 452 of the arcuate plate 416 will pass the lever 422. By the time the assembly is ready to rise, the roller 314 has contacted the plate 316 and pushed the assembly out a little farther so that the levers 422 and 416 will pass each other without actuating the solenoids, so that the peach thus properly oriented and carried by the jaws 181 and 192 will be next transferred to the peach bisecting station to be acted upon by the bisecting saws in the manner illustrated in the drawings.

From the consideration of the foregoing it will be thus appreciated that in one aspect of the machine we have utilized the sensing roller 283 for indicating the position of the suture plane of the whole peach and for determining whether or not the cutters 294 will act upon the peach. We have utilized this same sensing wheel as a suture plane determining means or sensing or inspecting member and have associated therewith peach processing control means and operated thereby due to and determined by the predetermined movement of this sensing wheel bodily with respect to the peach, or stated in other words, have utilized a predetermined relative movement between the peach and this inspecting means for actuating control mechanism which will preclude the further processing or cutting of the peach, to-wit by the bisecting means; if the peach be not properly oriented as to suture plane. In the present instance this means acts upon the jaws of the peach transfer device to eject the peach from the jaws before the peach is fed to the bisecting means.

Having thus described the invention, what is claimed as new and desired to be secured by Letters Patent is:

1. In combination, rotatable suture sensing means shaped to enter the long axis of the stem indent of a peach, means for causing the rotatable means to roll along the curved periphery of the peach and penetrate into the stem indent of the peach when the suture of the peach is aligned with the said rotatable sensing means, peach cutting means, means for conveying a peach to the rotatable sensing means and then to said cutting means, peach ejecting means operatively connected to said conveying means for ejecting an unoriented peach from said conveying means before said peach is conveyed to said cutting means, and means operatively connected to the rotatable sensing means and the peach ejecting means for actuating said peach ejecting means to eject peaches not having their sutures aligned with said sensing means while passing to said cutting means peaches which are aligned with said sensing means.

2. Peach or like fruit processing mechanism comprising in combination an orienting member shaped to conform to and to enter the stem indent of the peach along the long axis to maximum extent when registered with the suture plane of the peach, means for positioning the orienting member to receive a whole peach thereon, means for moving the peach and the orienting member relatively while the peach is received on said orienting member whereby to cause the suture plane of the peach to register with the long dimension of the orienting member and the peach to settle down on said orienting member to a maximum extent when so oriented as to suture plane, peach cutting means operating in a predetermined plane, peach feeding mechanism receiving the peach from said orienting member and operable to transfer the peach to the cutting means with the suture plane of a properly oriented peach lying in the plane of operation of the cutting means whereby to sever the peach along the suture plane, and means for preventing the feeding mechanism from transferring to said cutting means a peach not settled down to maximum extent on said orienting member prior to the reception of the peach by said feeding mechanism.

3. In a machine for handling whole fruit such as peaches, whole fruit receiving and feeding means including an elongated suture plane orienting member shaped to penetrate into the stem indent of a whole peach to maximum extent when aligned with the long axis of the stem indent of a whole peach carried by said receiving and feeding means, means for causing relative bodily movement between the whole peach and said orienting member to align the long axis of the stem indent of the peach with the orienting means, fruit bisecting means operatively connected to said feeding means to bisect fruit fed to said bisecting means by said feeding means, fruit position sensing means in advance of said bisecting means and operatively connected to said feeding means, said sensing means being shaped to enter the stem indent of the peach to maximum extent while aligned with the long axis of the stem indent of a properly oriented whole peach presented to said sensing means by said feeding means, and means operatively connected to said sensing means and to said feeding means to discharge from the feeding means in advance of the bisecting means a whole peach the stem indent of which is not aligned with the sensing means when presented to said sensing means by said feeding means.

References Cited in the file of this patent

UNITED STATES PATENTS

| Number | Name | Date |
| --- | --- | --- |
| 391,711 | Hiatt | Oct. 23, 1888 |
| 1,033,446 | Morton | July 23, 1912 |
| 1,915,447 | Robbins | June 27, 1933 |
| 1,992,838 | Redden | Feb. 26, 1935 |
| 2,225,979 | Carroll | Dec. 24, 1940 |
| 2,232,210 | Carroll | Feb. 18, 1941 |
| 2,268,696 | Carroll | Jan. 6, 1942 |
| 2,277,903 | Carroll | Mar. 31, 1942 |
| 2,420,659 | Ewald et al. | May 20, 1947 |